United States Patent [19]

Townsend et al.

[11] Patent Number: 5,577,116
[45] Date of Patent: Nov. 19, 1996

[54] APPARATUS AND METHOD FOR ECHO CHARACTERIZATION OF A COMMUNICATION CHANNEL

[75] Inventors: Keith Townsend, Cary, N.C.; Harish Punjabi, Falls Church, Va.; Alexandra Duel-Hallen, Cary; Samuel T. Alexander, Raleigh, both of N.C.

[73] Assignee: North Carolina State University, Raleigh, N.C.

[21] Appl. No.: 307,257

[22] Filed: Sep. 16, 1994

[51] Int. Cl.$^6$ ............................................. H04M 9/08
[52] U.S. Cl. ...................... 379/410; 379/406; 379/407; 379/411; 370/32.1
[58] Field of Search ..................... 379/410, 411, 379/406; 370/32.1, 32; 364/724.18, 724.19

[56] References Cited

U.S. PATENT DOCUMENTS

| | | | |
|---|---|---|---|
| 4,652,703 | 3/1987 | Lu et al. | 379/339 |
| 4,658,426 | 4/1987 | Chabries et al. | 381/94 |
| 4,760,596 | 7/1988 | Agrawal et al. | 379/410 |
| 4,947,425 | 8/1990 | Grizmala et al. | 379/410 |
| 5,117,418 | 5/1992 | Chaffee et al. | 370/32.1 |
| 5,163,044 | 11/1992 | Golden | 370/32.1 |
| 5,272,695 | 12/1993 | Makino et al. | 370/32.1 |
| 5,278,900 | 1/1994 | Van Gerwen et al. | 379/410 |
| 5,317,596 | 5/1994 | Ho et al. | 379/411 |
| 5,390,250 | 2/1995 | Janse et al. | 379/411 |

FOREIGN PATENT DOCUMENTS

0513527A2  11/1992  European Pat. Off. .

OTHER PUBLICATIONS

Mansour et al., *Unconstrained Frequency–Domain Adaptive Filter*, IEEE Transactions on Acoustics, Speech, and Signal Processing, vol. ASSP-30, No. 5, Oct. 1982, pp. 726–734.
International Search Report, PCT/US95/10614, Jan. 24, 1996.

*Primary Examiner*—Krista M. Zele
*Assistant Examiner*—Jacques M. Saint-Surin
*Attorney, Agent, or Firm*—Bell, Seltzer, Park & Gibson

[57] ABSTRACT

An apparatus for echo characterization or measurement includes a frequency domain adaptive filter for converging a plurality of filter coefficients based upon transmit and receive frequency domain transforms. The frequency domain adaptive filter preferably determines least mean square differences between estimated receive frequency domain transforms and the respective corresponding actual receive frequency domain transforms. The apparatus also preferably includes an echo characterization output portion for generating an echo characterization value for the communications channel. The echo characterization value may be one or both of echo path loss and echo delay. The apparatus preferably includes a gain normalization portion operatively connected to the adaptive filter for generating normalized gains of respective filter coefficients based upon spectral power of the respective transmit frequency domain transforms. Moreover, the apparatus also preferably includes a gain normalization weighting portion operatively connected to the gain normalization portion for weighting the normalized gains based upon frequency. An associated method is also disclosed.

39 Claims, 8 Drawing Sheets

FIG. 4a. (a): SPEECH FILE USED AS INPUT FOR SIMULATIONS

FIG. 4b. (b): ECHO IMPULSE RESPONSE

APPARATUS AND METHOD FOR ECHO CHARACTERIZATION OF A COMMUNICATION CHANNEL

FIELD OF THE INVENTION

The present invention relates to the field of communications, and more particularly, to an apparatus and method for monitoring or testing communications channels.

BACKGROUND OF THE INVENTION

In a typical telephone or communications channel of the public switched telephone network (PSTN), for example, portions of the channel may generate undesirable signal reflections or echoes. In particular, the transition between a two-wire circuit and four-wire circuit at a hybrid may generate an undesirable echo if impedances between the two circuits are not properly matched at the hybrid. For a voice signal being reflected back upon the speaker, a somewhat hollow or singing tone may be heard. If the echo has a sufficient delay, delayed intelligible speech may be heard by the speaker. The effect of an echo on a data signal may be to delay or spread the energy, perhaps causing intersymbol interference.

Hybrid repair or replacement, or the addition of an echo canceler may be readily effected once the source of the echo is determined. Accordingly, echo characterization or monitoring may be routinely performed by the telephone service provider. In particular, non intrusive, in-service testing of circuits for speech echo path loss (SEPL) and speech echo path delay (SEPD) may be performed. (See, ANSI Std. T1.221-1991 entitled "In-service Non Intrusive Measurement Device (INMD)"—Voice Service Measurements).

Because of the relatively large number of lines extending from a central office of the PSTN, it may be desirable to quickly and accurately test a significant number of the lines. Moreover, because a communications channel typically includes several portions or individual lines connected only for a particular call, in-service non intrusive testing is highly desirable. Not only does such testing detect echo problems permitting their correction, it also permits documentation of high quality service to users.

U.S. Pat. No. 4,947,425 discloses a digital signal processor to range and converge on each of a plurality of echoes occurring at respective echoes along a communications channel. The device adaptively filters or processes samples of a signal that has been transmitted along the communications channel correlated with samples of a signal received from the channel. The digital signal processor emulates three cascaded adaptive finite impulse response (FIR) filters. The output response of each filter obtained from a current sequence of samples of the transmitted signal convolved with the coefficients of the respective filter is processed with a corresponding sample of the received signal to provide an error signal. A time domain least-mean-squares (LMS) approach or algorithm, in turn, is used to process the error signal to generate a new set of filter coefficients which, in turn, are used to filter the next sample of the transmitted signal.

The LMS operation is repeated until the error signal reaches a minimum, thereby indicating convergence upon the echo. When a respective FIR filter converges on an echo, the digital signal processor uses the last set of filter coefficients to generate a measurement of echo path loss.

The transversal adaptive filter using the least mean square (LMS) algorithm of Widrow and Hopf has been widely used mainly due to its relative ease of implementation. (See B. Widrow et al., "Stationary and nonstationary learning characteristics of the LMS adaptive filter," *Proc. IEEE*, vol. 64, pp. 1151–1162, Aug. 1976). The major drawback of this time-domain LMS (TDLMS) algorithm is that as the eigenvalue spread of an input autocorrelation matrix R increases, the convergence speed of the algorithm decreases as discussed in J. C. Lee and C. K. Un, "Performance of transform-domain LMS adaptive signal filters," *IEEE Trans. Acoust., Speech, Signal Processing*, vol. ASSP-34, pp. 499–510, June 1986. This shortcoming led to the consideration of transform domain adaptive filters where the input signals are orthogonalized.

The transforms can be generally thought of as a set of parallel tuned filters. The filtering view of transforms is also able to predict the performance of the transform domain adaptive filter and suggests the transforms that suit specific applications. (See, for example, B. Farhang-Boroujeny and S. Gazor, "Selection of orthonormal transformers for improving the performance of transform domain normalised LMS algorithm," *IEEE Proceedings, Part F: Radar and Signal Processing*, vol. 139, pp. 327–335, Oct. 1992). The new transformed set of samples, with minimum correlation among them, is then normalized in proportion to the inverse of the energy of the individual taps, thus accelerating convergence. Another advantage of transform domain algorithms is increased computational efficiency due to block processing. The efficiency of an orthonormal transform, in improving the performance of the LMS algorithm, depends on its ability to spread the energy levels of its output components, i.e., the ability to reduce the crosscorrelation between the transformed samples.

Research has also shown that transformation without normalization does not improve performance of the adaptive filters as discussed in B. Farhang-Boroujeny and S. Gazor, "Selection of orthonormal transforms for improving the performance of transform domain normalised LMS algorithm," *IEEE Proceedings, Part F: Radar and Signal Processing*, vol. 139, pp. 327–335, Oct. 1992. This is because the autocorrelation matrix R and the transformed matrix $R_T$ are similar matrices with the same eigenvalues. Transformation is useful in attempting to diagonalize R; however, the normalization process tends to make the eigenvalues, that is, the rate of convergence of the different modes, equal. Also, orthonormal transformation followed by normalization typically does not degrade the performance of the LMS algorithm. (See, B. Farhang-Boroujeny and S. Gazor, "Selection of orthonormal transforms for improving the performance of transform domain normalised LMS algorithm," *IEEE Proceedings, Part F: Radar and Signal Processing*, vol. 139, pp. 327–335, Oct. 1992).

Unfortunately, the major drawback of time-domain LMS (TDLMS) approaches for echo characterization is that such approaches are relatively slow. In addition, computational complexity must also be considered in implementing an approach to reduce cost. The effects of return noise present on the communications channel may also require consideration for accurate measurements.

SUMMARY OF THE INVENTION

In view of the foregoing background, it is therefore an object of the present invention to provide an apparatus and method which may be readily implemented without undue computational complexity for accurately and quickly characterizing an echo of a communications channel.

It is another object of the present invention to provide an apparatus and method for conducting echo characterization of a communications channel which is stable in the presence of return noise.

These and other objects, features and advantages of the present invention are provided by an apparatus for echo characterization, or measurement, that includes frequency domain adaptive filter means operatively connected to transmit and receive frequency domain transform means for converging a plurality of filter coefficients based upon transmit and receive frequency domain transforms. The frequency domain adaptive filter means preferably includes least mean squares determining means for determining least mean square differences between estimated receive frequency domain transforms and the respective corresponding actual receive frequency domain transforms.

The apparatus also preferably includes echo characterization output means operatively connected to the frequency domain adaptive filter means for generating an echo characterization value for the communications channel. The echo characterization value is preferably echo path loss, or echo delay, and more preferably, both echo path loss and delay.

The apparatus preferably includes transmit sampling means for generating a series of sampled transmit values of a speech signal or other uncorrelated signal which is transmitted on the communications channel. Similarly, the apparatus preferably includes receive sampling means for generating a series of sampled receive values of a signal received on the communications channel based upon the signal transmitted on the communications channel. Each of these sampling means is preferably operatively connected to respective frequency domain transform means for generating respective transmit and receive frequency domain transforms of the sampled values. The frequency domain transform and adaptive filtering of the invention provides greater convergence speed as compared to conventional time domain echo measurement devices.

The apparatus preferably also includes gain normalization means operatively connected to the adaptive filter for generating normalized gains of respective filter coefficients based upon spectral power of the respective transmit frequency domain transforms. Moreover, the apparatus also preferably includes gain normalization weighting means operatively connected to the gain normalization means for weighting the normalized gains based upon frequency. In particular, speech typically includes a relatively higher power in the lower frequency range. The gain normalization weighting means preferably provides greater weighting at lower frequencies that at the higher frequencies. Accordingly, the stability of the processing is improved, particularly in the presence of high return noise power in the receive signal.

Display means, such as a printer, CRT screen or other display may be operatively connected to the echo characterization output means for displaying the echo characterization value for the communications channel. In addition, logging means may be provided for recording the echo characterization value, a time the echo characterization was made, and a configuration of the communications channel at the time the echo characterization was made. Accordingly, in-service non intrusive measurements relating to the quality of the communications channel may be readily performed.

The invention may be readily implemented by a microprocessor operating under stored program control. Moreover, the invention may be implemented through programming of a telephone switch and used in conjunction with other maintenance/diagnostic features of the switch. In particular, the switch is connected to a plurality of telephone lines to selectively and dynamically establish connections between predetermined ones of the telephone lines to thereby establish a communications channel. Accordingly, the echo characterization means may be operatively connected to the communications channel established by the switch for generating an echo characterization value of the communications channel as described above.

A method aspect of the invention is for characterizing echo of a communications channel. The method comprises the steps of: generating a series of sampled transmit values of a signal transmitted on the communications channel; generating respective transmit frequency domain transforms of the sampled transmit values; generating a series of sampled receive values of a signal received on the communications channel based upon the signal transmitted on the communications channel; generating respective receive frequency domain transforms of the sampled receive values; converging a plurality of filter coefficients of a frequency domain adaptive filter based upon the transmit and receive frequency domain transforms; and generating an echo characterization value for the communications channel based upon convergence of the filter coefficients.

The method also preferably includes the step of generating normalized gains of respective filter coefficients based upon spectral power of the respective transmit frequency domain transforms, wherein the step of weighting the normalized gains is based upon frequency. For a speech signal, the normalized gains at a lower frequency preferably have a greater weighting than normalized gains at higher frequencies.

BRIEF DESCRIPTION OF THE DRAWINGS

FIG. 3b is a graph of the power spectrum of a receive signal for a low noise and high noise simulation based upon the transmitted speech signal as shown FIG. 3a.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
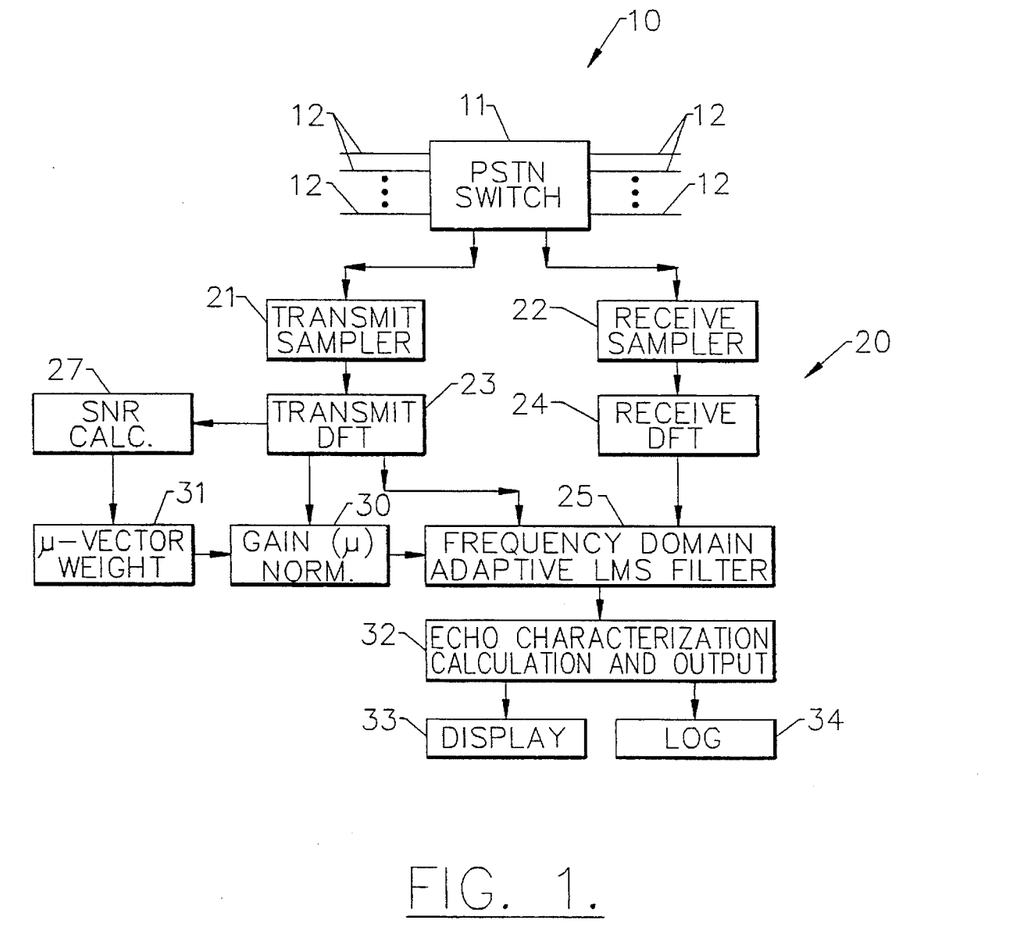
FIG. 1 is a schematic block diagram of a portion of the public switched telephone network including the echo characterization apparatus according to the invention.
Figure 2:
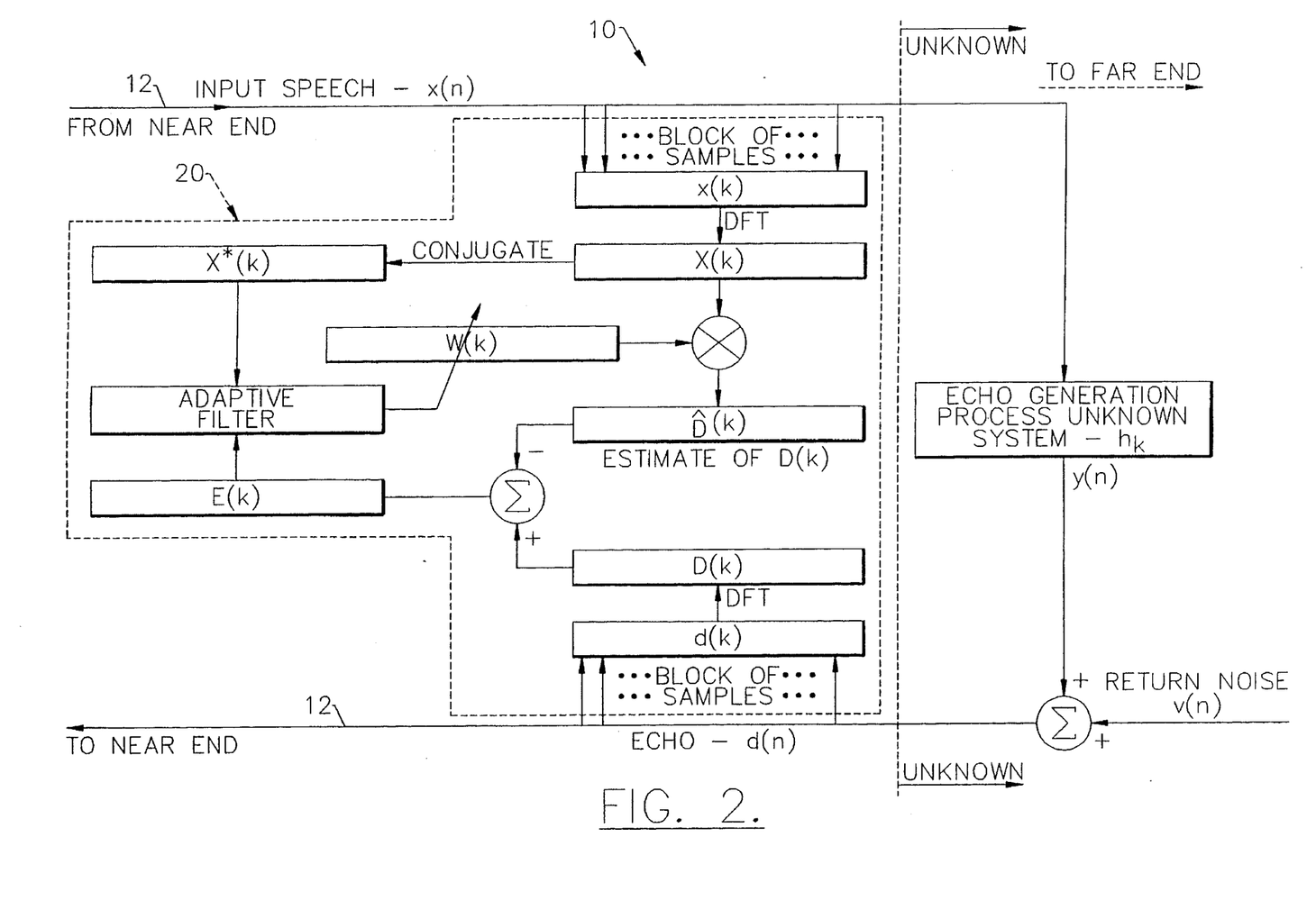
FIG. 2 is a schematic block diagram of the echo characterization apparatus according to the invention.

Referring first to FIGS. 1 and 2, the frequency domain echo characterization apparatus 20 according to the invention is described as used in a typical telephone system 10. The apparatus 20 may be readily used in combination with a PSTN switch 11 which includes means for selectively and dynamically connecting predetermined telephone lines 12 to one another to establish a communications channel. As would be readily understood by those skilled in the art, the echo characterization apparatus 20 may be readily used in other communications channel testing or monitoring applications.

In the illustrated embodiment, the echo characterization apparatus 20 is shown as a separate device or circuit connected to the switch 11. Accordingly, the echo characterization apparatus 20 may be operatively connected to the communications channel established by the switch 11 for generating an echo characterization value of the communications channel. However, those of skill in the art will readily appreciate that the echo characterization apparatus according to the invention may be readily implemented internally of the switch 11 through software and used in conjunction with other maintenance/diagnostic features of the switch.

The apparatus 20 includes transmit sampling means 21 for generating a series of sampled transmit values of a speech signal or other uncorrelated signal which is transmitted on the communications channel. Similarly, the apparatus 20 includes receive sampling means 22 for generating a series of sampled receive values of a signal received on the communications channel based upon the signal transmitted on the communications channel. Each of these sampling means 21, 22 is preferably operatively connected to respective frequency domain transform means 23, 24 for generating respective transmit and receive frequency domain transforms of the sampled values.

The echo characterization apparatus 20 preferably includes frequency domain adaptive filter means 25 operatively connected to transmit and receive frequency domain transform means 23, 24 for converging a plurality of filter coefficients based upon transmit and receive frequency domain transforms, as described in greater detail below. As illustrated, the frequency domain adaptive filter means 25 preferably includes least mean square determining means for determining least mean square differences between estimated receive frequency domain transforms and the respective corresponding actual receive frequency domain transforms as would be readily understood by those skilled in the art. The frequency domain transform and adaptive filtering of the invention provides greater convergence speed as compared to conventional time domain echo measurement devices.

The apparatus 20 preferably also includes gain ($\mu$) normalization means 30 operatively connected to the adaptive filter means 25 for generating normalized gains of respective filter coefficients based upon spectral power of the respective transmit frequency domain transforms. Moreover, the apparatus 20 also preferably includes gain normalization vector weighting means 31 operatively connected to the gain normalization means 30 for weighting the normalized gains based upon frequency. The gain normalization vector weighting means 31 is responsive to the signal-to-noise ratio (SNR) calculator 27. In general, speech typically includes a relatively higher power in the lower frequency range. The gain normalization vector weighting means 31 preferably provides greater weighting at lower frequencies than at the higher frequencies. Accordingly, the stability of the processing is improved, particularly in the presence of high return noise in the receive or return signal.

The apparatus 20 also preferably includes echo characterization output means 32 operatively connected to the frequency domain adaptive filter means 25 for generating an echo characterization value for the communications channel as would be readily understood by those skilled in the art. The echo characterization value is preferably echo path loss, or echo delay, and more preferably, both echo path loss and delay. As would be readily understood by those of skill in the art, echo path delay may be readily calculated based upon the largest sample of the estimate of the communications channel impulse response. The echo path loss may also be readily determined as described more fully below.

Display means 33, such as a printer, CRT screen or other display may be operatively connected to the echo characterization output means 32 for displaying the echo characterization value, such as echo path loss and/or echo delay, for the communications channel. In addition, logging means 34 may be provided for recording the echo characterization value, a time the echo characterization was made, and a configuration of the communications channel at the time the echo characterization was made, as would be readily understood by those skilled in the art. Accordingly, as would be readily understood by those skilled in the art, in-service non intrusive measurements relating to the quality of the communications channel of the telephone system 10 may be readily performed by the apparatus 20 according to the invention.

As would be readily understood by those skilled in the art, discrete Fourier transform (DFT) is widely used for applications with large filter lengths N. This is because for large N, the eigenvalues of the input autocorrelation matrix R are approximately given by the uniformly spaced samples of the input power spectrum, that is, the DFT approximately diagonalizes R. (See, E. R. Ferrara, Jr., "Frequency domain adaptive filtering" in C. F. N. Cowan and P. M. Grant, Adaptive Filters, Prentice-Hall, Englewod Cliffs, N.J., 1985, and A. S. Deeba and S. L. Wood, "Convergence rate improvements for frequency domain implementations of LMS adaptive filters," 1990 (24th) *Asilomar Conference on Signals, Systems and Computers*, vol. 2, pp. 754–757, November 1990, (pseudo-orthogonality property of the DFT)). In addition, many researchers have discussed the theoretical issues such as steady-state excess mean square error (MSE), efficiency of the orthogonal transform, and computational complexity of the normalized frequency-domain LMS (NFDLMS) algorithm and other transform domain algorithms. (See, for example, J. C. Lee and C. K. Un, "Performance Analysis of frequency-domain block LMS adaptive digital filters," *IEEE Trans. on Circuits and Systems*, vol. 36, pp. 173–189, Feb. 1989; and B. Farhang-Boroujeny and S. Gazor, "Selection of orthonormal transforms for improving the performance of transform domain normalised LMS algorithm," *IEEE Proceedings, Part F: Radar and Signal Processing*, vol. 139, pp. 327–335, Oct. 1992).

A method aspect of the invention is for characterizing echo of a communications channel. The method comprises the steps of: generating a series of sampled transmit values of a signal transmitted on the communications channel; generating respective transmit frequency domain transforms of the sampled transmit values; generating a series of sampled receive values of a signal received on the communications channel based upon the signal transmitted on the communications channel; generating respective receive frequency domain transforms of the sampled receive values; converging a plurality of filter coefficients of a frequency domain adaptive filter based upon the transmit and receive frequency domain transforms; and generating an echo characterization value for the communications channel based upon convergence of the filter coefficients.

The method also preferably includes the step of generating normalized gains of respective filter coefficients based upon spectral power of the respective transmit frequency domain transforms, wherein the step of weighting the normalized gains is based upon frequency. For a speech signal, the normalized gains at a lower frequency preferably have a greater weighting than normalized gains at higher frequencies.

Referring now more particularly to FIG. 2, further aspects and features of the signal processing of the invention are described in greater detail. Generally, echoes are generated due to impedance mismatches at various points in the communications channel. The input speech x(n) is processed by the echo path model (i.e., the unknown system $h_k$, of length N, to be identified) and is reflected back as the echo d(n), which is given by $$y(n) = x(n) * h_k = \sum_{k=0}^{N-1} h_k x(n-k) \quad (1)$$

and $$d(n) = y(n) + v(n) \quad (2)$$

In FIG. 2, v(n) is a noise signal independent of the system output y(n). Since this echo d(n) is undesirable, it is required that echo cancelers be used at the near end. Also, for the purpose of analysis of the telephone communications channel, it is typically required that the echo path loss (EPL), that is, the loss in dB between the input x(n) and the return echo d(n), be measured. The EPL is related to the echo path impulse response $h_k$ by the following, $$EPL(dB) = -10\log_{10}\left(\sum_{k=0}^{N-1} |h_k^2|\right) \quad (3)$$

In either case, it is desirable to first identify the unknown system $h_k$. A smaller error in the estimation of the EPL is, in general, representative of a better estimate of the unknown system $h_k$.

The equation for implementing the normalized frequency domain least mean square (NFDLMS) approach is given by $$W_i(k+1) = W_i(k) + \mu_i(k) E_i(k) X_i^*(k) \quad 1 \leq i \leq N \quad (4)$$

where $W_i$ is the ith weight of the complex filter in the frequency domain corresponding to the ith spectral bin, k is the block or iteration number, N is the length of the filter and $\mu_i$ is the normalization factor for the ith bin. Uppercase variables denote quantities in the frequency domain and the bold letters in FIG. 2 denote blocks of respective data. In FIG. 2, the DFT of the input block of data x is denoted by X. Also, the DFT of the output block of data d is given by D and $\hat{D}$ represents the estimate of D. The error block in the frequency domain E is given by $$E_i(k) = D_i(k) - \hat{D}_i(k) \quad 1 \leq i \leq N \quad (5)$$

The FDLMS approach can be implemented in any one of the various ways as would be readily understood by those skilled in the art, as disclosed, for example, in an article by E. R. Ferrara, Jr., "Frequency domain adaptive filtering" in C. F. N. Cowan and P.M. Grant, *Adaptive Filters*, Prentice-Hall, Englewod Cliffs, N.J., 1985; by S. S. Narayan, A. M. Peterson and M. J. Narasimha, "Transform domain LMS adaptive digital filters," *IEEE Trans. Acoust., Speech, signal processing*, vol. ASSP-31, pp. 609–615, June 1983, D. Mansour and A. H. Gray, "Unconstrained frequency-domain adaptive filter," *IEEE Trans. Acoust., Speech, Signal Processing*, vol. ASSP-30, pp. 726–734, Oct. 1982. The entire disclosures of these articles is incorporated herein by reference. The unconstrained FDLMS approach has been used in the illustrated embodiment using the DFT and the overlap-save sectioning method.

Normalization requires the estimation of input power, which can be calculated as an arbitrary linear weighting on the magnitude square of the data. For nonstationary inputs, as in our application, a recursive update of the following form is generally used as would be readily understood by those skilled in the art:

$$p_i(k) = \gamma p_i(k-1) + (1-\gamma)|X_i(k)|^2 \quad (6)$$

In equation 6, $p_i$ represents the input power estimate of the ith spectral bin during the kth iteration, $\gamma$ is a windowing constant between 0 and 1, and $X_i$ is the ith DFT component of input block. The computation of the normalization weight vector $\mu_i$ is given by $$\mu_i(k) = \alpha/p_i(k) \quad 1 \leq i \leq N \quad (7)$$

where $\alpha$ is a constant between 0 and 1.

The NFDLMS approach works efficiently and remains stable where there is little or no return noise v(n) present in the system. However, when noise is present in the returned or receive signal, as is the case in most practical applications, it is seen that the NFDLMS algorithm may become unstable in those frequency bins where the input power is much smaller than the power in other frequency bins.

Figure 3A:
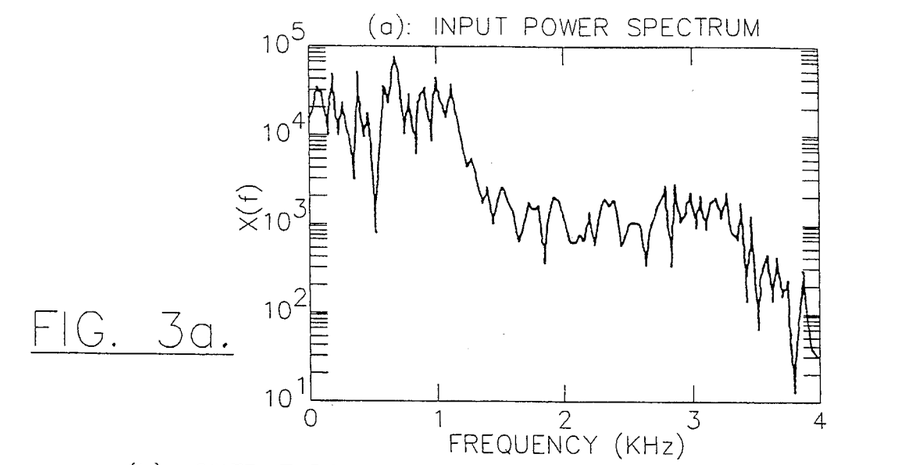
FIG. 3a is a graph of the power spectrum of a transmitted speech signal used for simulating operation of the echo characterization apparatus according to the invention.
Figure 3B:
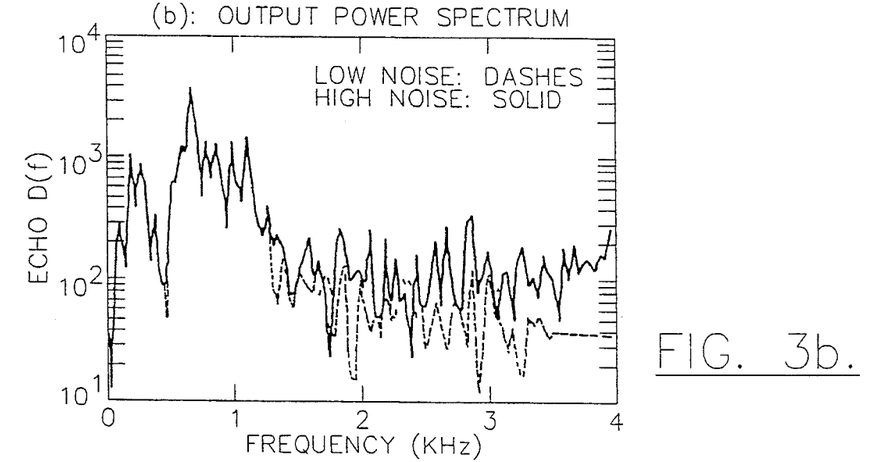
Figure 3C:
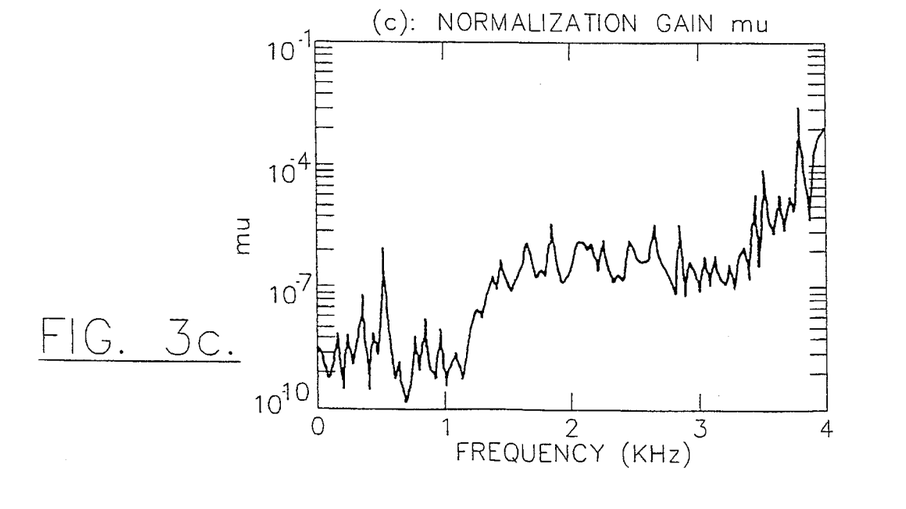
FIG. 3c is a graph of the normalization gain based upon the signals as shown in FIGS. 3a and 3b and prior to weighting of the normalization gain in accordance with another aspect of the invention.

FIG. 3a shows the power spectrum of the speech input obtained in a typical iteration while simulating the estimation of the telephone echo channel using the NFDLMS approach. The bandwidth shown is 4 KHz, which is approximately equal to the telephone communications channel bandwidth. It can be seen that, for speech, most of the power is present in the lower frequencies. FIG. 3b shows the power spectrum of the return signal for a low noise (solid line) and a high noise case (dotted line) corresponding to the input in FIG. 3a. As illustrated, the higher frequencies in the return signal are more affected by the presence of noise due to a smaller component of signal power in those frequencies. However, the calculation of the normalization gain $\mu_i$ shown in FIG. 3c, is dependent only on the input signal blocks and is independent of the return noise. Also, the estimate of the returned signal block in the frequency domain $\hat{D}(k)$ is independent of the return noise.

Thus, from Equation 4 it is shown that in the higher frequency bins, the error $E_i(k)$ is larger for the high noise case than that for the low noise case. Hence, the weight update in these frequencies is larger than what it would have been in the noiseless case. This may lead to overcompensation in the higher frequencies, resulting in instability of the approach. However, for the low noise case, the NFDLMS algorithm worked satisfactorily as expected; the effect of noise on the higher frequencies being small the approach appears rather stable.

Figure 3D:
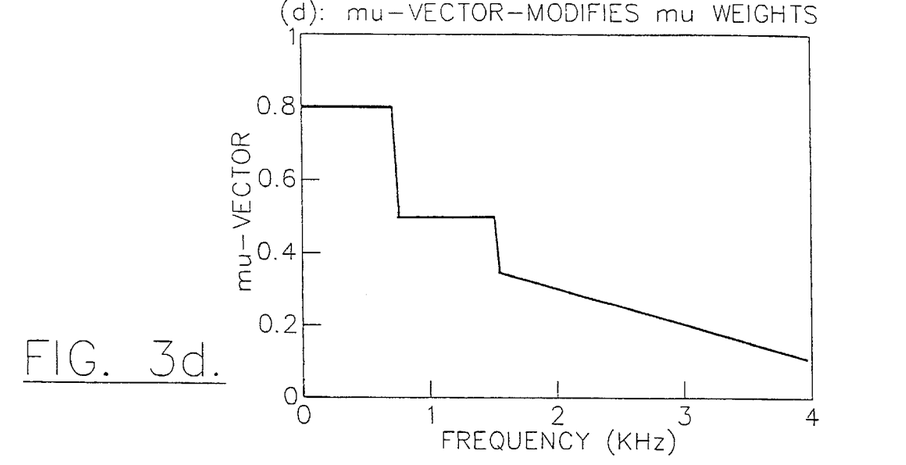
FIG. 3d is a graph of a first embodiment of a weighting vector for modifying the normalized gain as shown in FIG. 3c.

To address the potential problem of overcompensation due to normalization, the gain $\mu_i$ for the higher frequencies is preferably reduced. This was simulated by multiplying the normalization gain $\mu_i$ by the normalization gain control vector (denoted here also as $\mu$-vector). FIG. 3d shows one such $\mu$-vector for a moderately high SNR. In this application, the $\mu$-vector was computed using the estimated average echo signal to return noise ratio (ENR). The ENR is given by the ratio of the root mean square values (rms) of the echo signal and noise. The rms of the echo signal is calculated by using a sliding window over those sections of echo signal which correspond to the presence of speech in the input signal.

Figure 3E:
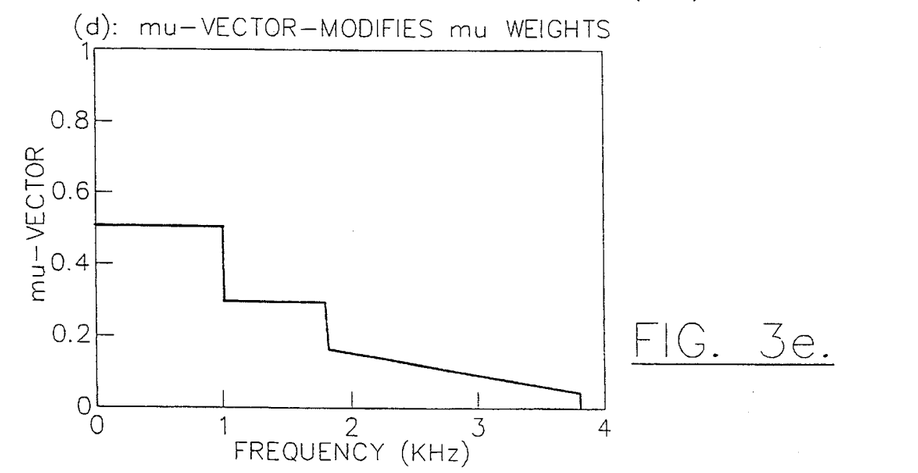
FIG. 3e is a graph of a second embodiment of a weighting vector for modifying the normalized gain as shown in FIG. 3c.
Figure 3F:
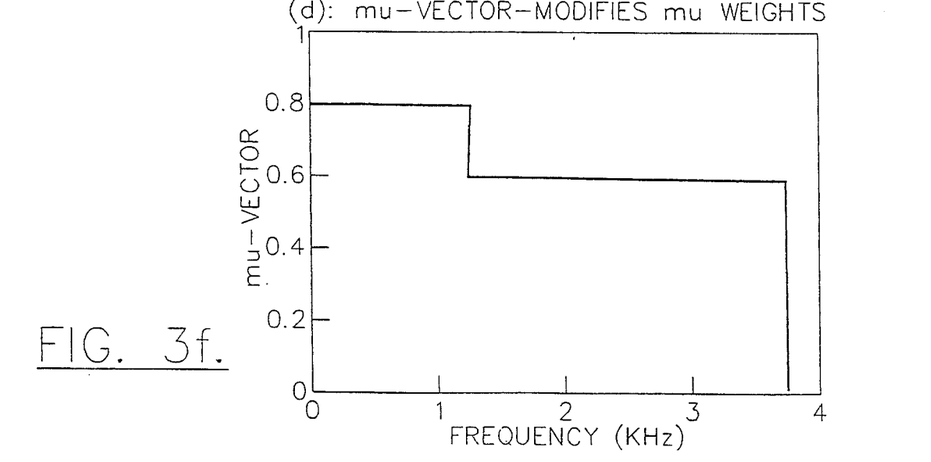
FIG. 3f is a graph of a third embodiment of a weighting vector for modifying the normalized gain as shown in FIG. 3c.
Figure 3G:
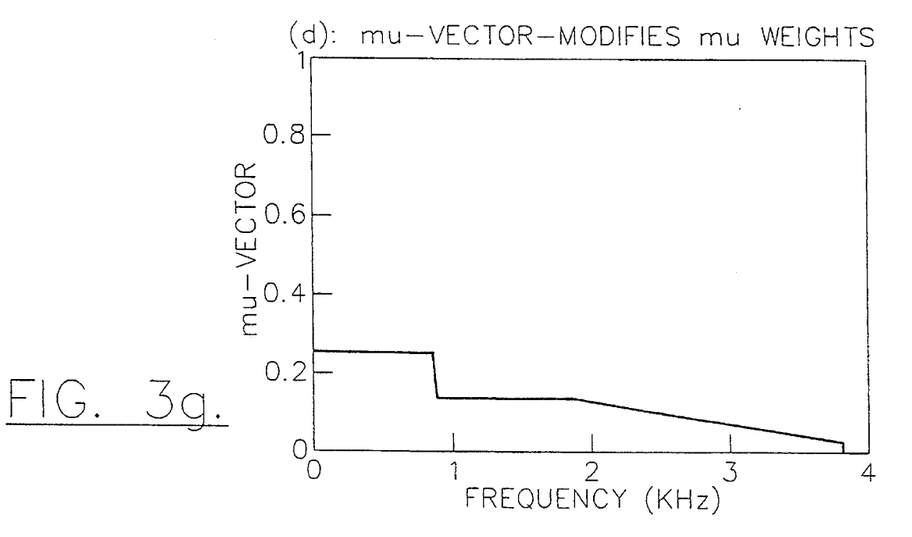
FIG. 3g is a graph of a fourth embodiment of a weighting vector for modifying the normalized gain as shown in FIG. 3c.

Similarly, the average rms value of noise is found using the sections of the echo signal corresponding to the sections of the input signal where the speech is not present. Since the rms value of speech does not fluctuate very rapidly and the average noise power is constant, it is not necessary to calculate the rms value at all sample points and interpolation can be used. This ensures that the computation involved in the estimation of the ENR remains insignificant relative to the overall computation of the algorithm. In one embodiment, the approach selects one of four different $\mu$-vectors depending on the estimated ENR value. The three other $\mu$-vectors are shown in FIGS. 3e–3g. The $\mu$-vector of FIG. 3e is for a moderately low SNR, while FIG. 3f is for a relatively high SNR and FIG. 3g is for a relatively low SNR. The estimation of ENR and the choice of a $\mu$-vector may be readily incorporated within the overall approach as would be readily understood by those skilled in the art.

Heuristics and experimental observations have been used to develop the four $\mu$-vectors and it was found that the performance of the modified approach was satisfactory. Some speed in convergence may be sacrificed to gain more stability in the higher frequencies. However, the weighted normalization gain approach was still much faster than the TDLMS approach and may be more stable than an NFDLMS approach.

EXAMPLE

The following example is included for further illustrating the invention to those of skill in the art, and should not be construed as limiting of the invention.

Figures 4A, 4B:
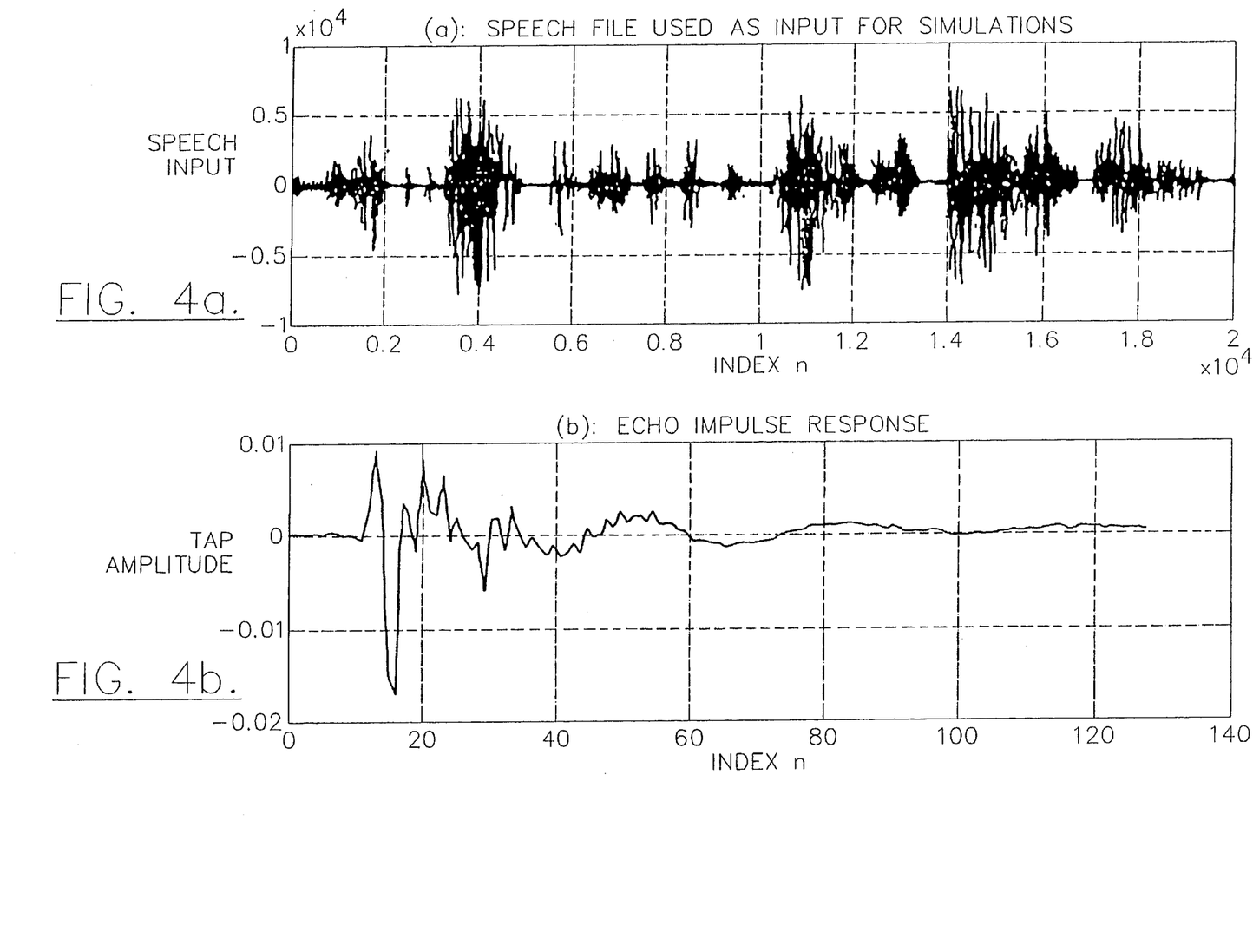
FIG. 4a is a graph for a speech signal used for simulations of the echo characterization apparatus according to the invention as described in the examples.
FIG. 4b is a graph for a typical echo impulse response from simulations of the echo characterization apparatus according to the invention as described in the examples.

To compare the modified $\mu$-vector NFDLMS approach with the NFDLMS and TDLMS approaches, we performed experiments using computer simulations. Five different speech segments were used as input. Each speech source had approximately 20,000 samples corresponding to 3 seconds of data at the sampling rate of 8,000 Hz. This source included both pauses in the speech and background room noise. One such speech source is shown in FIG. 4a. These speech sources were derived from five of the one minute near-end conversations on the ANSI standard speech tape, In-service Non-Intrusive Measurement Devices (INMD)— Voice Service Measurements. ANSI Std. T1.221-1991.

Eight different echo impulse responses of length N=128 represented the unknown system $h_k$ in various tests. FIG. 4b shows a typical echo impulse response. A constant EPL of 30 dB was used in all experiments.

Figure 4C:
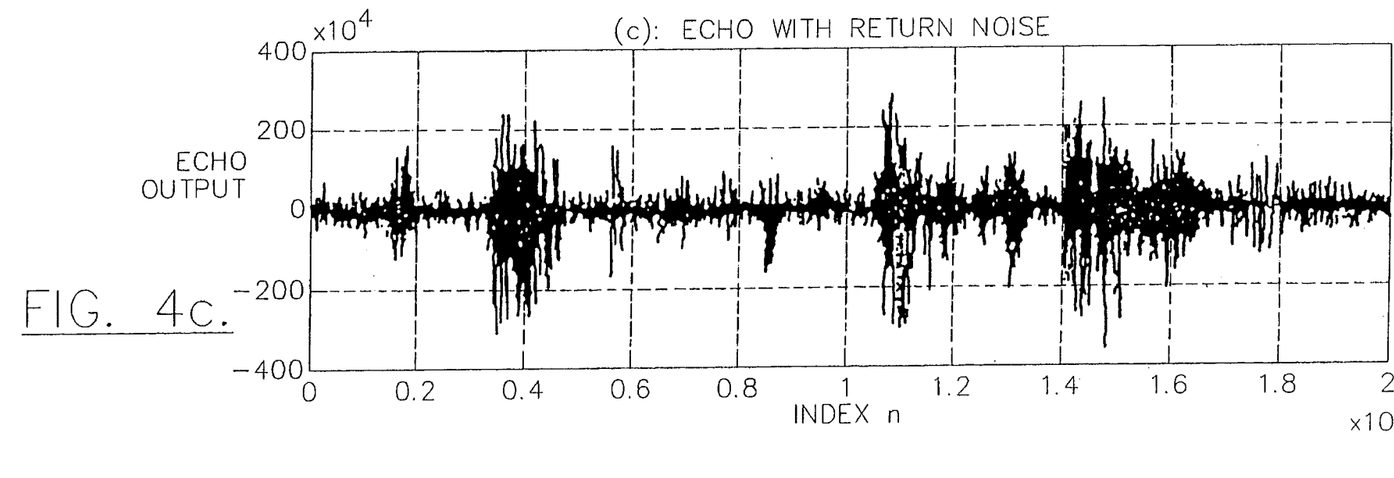
FIG. 4c is a graph for a typical receive or echo return signal from simulations of the echo characterization apparatus according to the invention as described in the examples.

The powers of the return noise were chosen so that the ENR values varied between 6 and 40 dB in 35 various tests. A total of 45 tests were run using various combinations of input speech file, echo impulse responses and return noise values. The same tests were also run on the time-domain LMS (TDLMS) algorithm. FIG. 4c shows a typical echo signal with return noise. The input signal to return noise ratio is plotted in FIG. 4d.

Figure 4D:
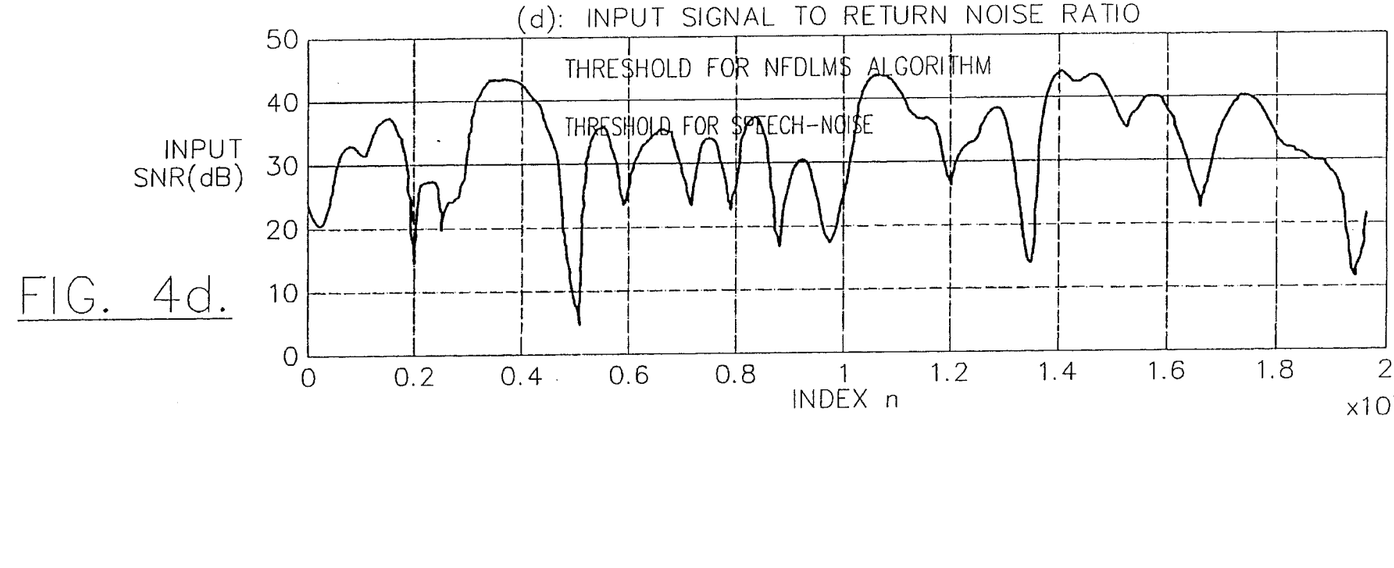
FIG. 4d is a graph of receive frequency domain transform spectra for the echo signal and return noise signal further illustrating threshold selection of the receive frequency domain spectrum.

The apparatus automatically selects a threshold (threshold for FDLMS approach in FIG. 4d), so that approximately the 'best' 3,000 samples are above the threshold. These points are used for convergence by the frequency-domain adaptive filter. Also, a threshold at 30 dB was used to distinguish approximately between the speech sections and the noise sections and is also shown in FIG. 4d. The time-domain algorithm used the first 8,000 samples from the speech samples (above the threshold for speech-noise in FIG. 4d) for convergence. The speech-noise threshold was also used to compute the ENR value in Table 1 below. The table also shows the EPL errors for the TDLMS, the NFDLMS and the modified NFDLMS approaches. The results for 9 of the 45 test conditions have been tabulated. The same speech source file was used for each of these tests, though the return noise level was varied to give different ENR values. The remaining 36 tests used the other four speech sources, yielding results similar to the 9 tests in Table 1. Reference EPL=30 dB for all conditions, while five sources used were denoted as A-E, and eight filters used were denoted as a-h.

TABLE 1

| Test No. | Source no. | Filter | Return noise rms value | ENR (dB) | EPL error TDLMS (dB) | EPL error modified NFDLMS (dB) | EPL error unmodified NFDLMS (dB) |
|---|---|---|---|---|---|---|---|
| 1 | A | a | 2.0 | 30.0 | 0.4 | 0.17 | 0.65 |
| 2 | A | b | 5.0 | 21.8 | 0.66 | 0.38 | 3.0 |
| 3 | A | c | 20.0 | 9.8 | 1.04 | 0.7 | 13.7 |
| 4 | A | d | 1.0 | 36.0 | 0.53 | 0.31 | 0.09 |
| 5 | A | e | 3.0 | 26.3 | 0.52 | 0.3 | 0.86 |
| 6 | A | f | 14.0 | 13.0 | 1.5 | 0.67 | 11.3 |
| 7 | A | g | 0.7 | 39.0 | 0.55 | 0.35 | 0.1 |
| 8 | A | h | 10.0 | 15.8 | 0.59 | 0.61 | 5.2 |
| 9 | A | a | 25.0 | 7.9 | 0.26 | 0.1 | 12.7 |

Figure 5A:
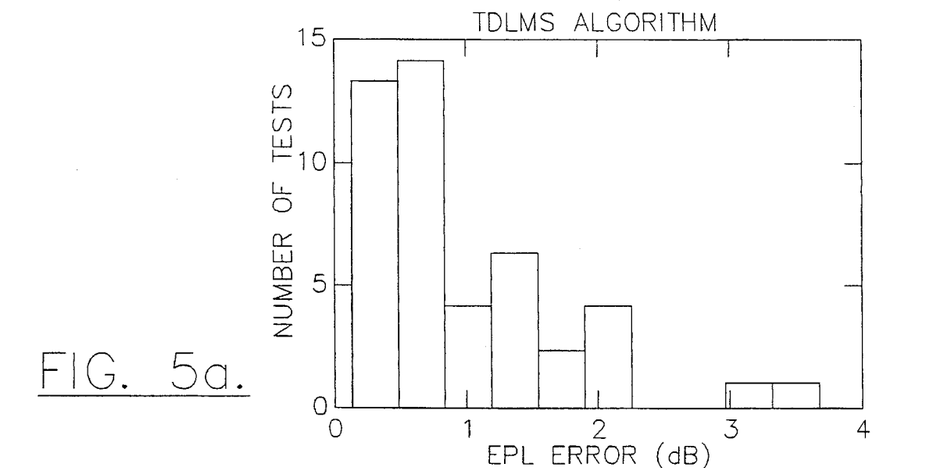
FIG. 5a is a histogram of simulated error for a conventional time domain echo characterization simulation.
Figure 5B:
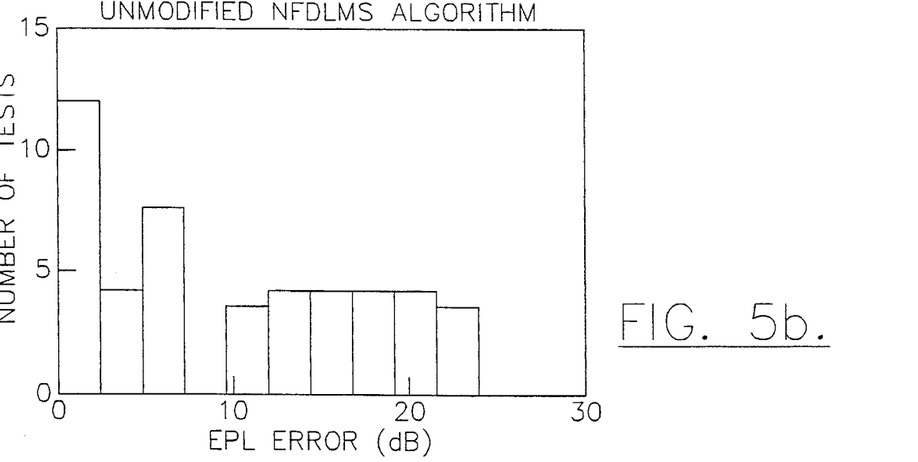
FIG. 5b is a histogram of simulated error for a frequency domain echo characterization simulation according to the invention.
Figure 5C:
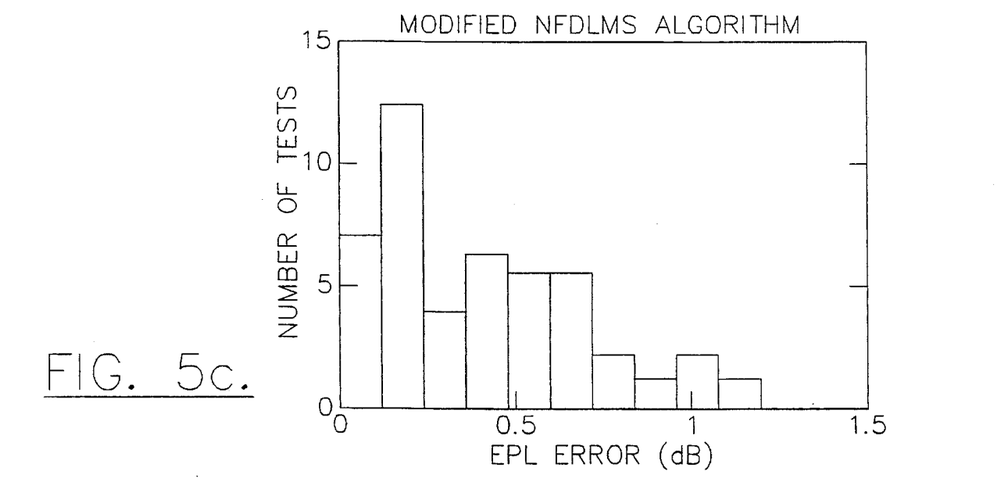
FIG. 5c is a histogram of simulated error for a weighted normalized gain frequency domain echo characterization simulation according to another aspect of the invention.

FIGS. 5a, 5b, and 5c plot the histogram of EPL errors for the three algorithms. Note that, barring two readings corresponding to very high noise cases, the TDLMS yielded EPL error of less than 2.5 dB in magnitude. The EPL errors of the modified µ-weighted NFDLMS were less than 1.3 dB in magnitude for all cases. Both the NFDLMS and the µ-weighted NFDLMS approaches were 8 times faster than the TDLMS algorithm. The NFDLMS algorithm without µ-weights may become unstable for medium and high return noise cases, resulting in EPL errors over 3 dB to about 20 dB. However, for low noise cases the NFDLMS algorithm worked accurately with EPL errors less than 2 dB; also it converged a bit faster than the µ-weighted NFDLMS approach in those cases.

Table 1 also indicates that the advantage of speed of the NFDLMS algorithm over the TDLMS algorithm may be diminished when return noise is present because of instability and that the modified approach achieves both speed and accuracy in estimating the EPL, that is, estimating the system $h_k$. For the simulated telephone echo channel, the modified µ-weighted NFDLMS approach was seen to be 8 times faster than the TDLMS approach. Thus the modified µ-weighted NFDLMS approach has the advantages of both speed and stability.

Other criteria such as the steady-state mean square error could have been used instead of the echo path loss as a performance index of the approaches as would be readily understood by those skilled in the art. Moreover, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for echo characterization of a communications channel, said apparatus comprising:

transmit sampling means for generating a series of sampled transmit values of a signal transmitted on the communications channel;

transmit frequency domain transform means operatively connected to said transmit sampling means for generating respective transmit frequency domain transforms of the sampled transmit values;

receive sampling means for generating a series of sampled receive values of a signal received on the communications channel based upon the signal transmitted on the communications channel;

receive frequency domain transform means operatively connected to said receive sampling means for generating respective receive frequency domain transforms of the sampled receive values;

frequency domain adaptive filter means operatively connected to said transmit and receive frequency domain transform means for converging a plurality of filter coefficients based upon the transmit and receive frequency domain transforms;

echo characterization output means operatively connected to said frequency domain adaptive filter means for generating an echo characterization value for the communications channel;

gain normalization means operatively connected to said frequency domain adaptive filter means for generating normalized gains of respective filter coefficients based upon spectral power of the respective transmit frequency domain transforms; and gain normalization weighting means operatively connected to said gain normalization means for weighting the normalized gains based upon frequency;

wherein said gain normalization weighting means further comprises means for weighting the normalized gains as a predetermined function of frequency; and wherein said gain weighting means further comprises means for determining an estimated average echo to return noise ratio based upon the signal received from the communications channel and for selecting a predetermined gain normalization weighting function based upon the ratio.

2. An apparatus according to claim 1 wherein said echo characterization output means comprises means for generating an echo path loss value.

3. An apparatus according to claim 1 wherein said echo path characterization means comprises means for generating an echo delay value.

4. An apparatus according to claim 1 wherein said frequency domain adaptive filter means comprises least means squares determining means for determining least mean square differences between estimated receive frequency domain transforms and the respective corresponding receive frequency domain transforms.

5. An apparatus according to claim 1 further comprising threshold selection means operatively connected to said transmit frequency domain transform means for selecting values above a predetermined spectral power threshold.

6. An apparatus for echo characterization of a communications channel, said apparatus comprising:

transmit sampling means for generating a series of sampled transmit values of a signal transmitted on the communications channel;

transmit frequency domain transform means operatively connected to said transmit sampling means for generating respective transmit frequency domain transforms of the sampled transmit values;

receive sampling means for generating a series of sampled receive values of a signal received on the communications channel based upon the signal transmitted on the communications channel;

receive frequency domain transform means operatively connected to said receive sampling means for generating respective receive frequency domain transforms of the sampled receive values;

frequency domain adaptive filter means operatively connected to said transmit and receive frequency domain transform means for converging a plurality of filter coefficients based upon the transmit and receive frequency domain transforms;

echo characterization output means operatively connected to said frequency domain adaptive filter means for generating an echo characterization value for the communications channel; and display means operatively connected to said echo characterization output means for displaying the echo characterization value for the communications channel.

7. An apparatus according to claim 6 further comprising gain normalization means operatively connected to said frequency domain adaptive filter means for generating normalized gains of respective filter coefficients based upon spectral power of the respective transmit frequency domain transforms.

8. An apparatus according to claim 7 further comprising gain normalization weighting means operatively connected to said gain normalization means for weighting the normalized gains based upon frequency.

9. An apparatus according to claim 8 wherein said gain normalization weighting means further comprises means for weighting the normalized gains as a predetermined function of frequency.

10. An apparatus according to claim 8 wherein said gain normalization weighting means further comprises means for weighting the normalized gains so that normalized gains at a lower frequency have a greater weighting than normalized gains at higher frequencies.

11. An apparatus according to claim 6 further comprising logging means for recording the echo characterization value, a time the echo characterization was made, and a configuration of the communications channel at the time the echo characterization was made.

12. An apparatus for echo characterization of a communications channel, said apparatus comprising:

transmit sampling means for generating a series of sampled transmit values of a signal transmitted on the communications channel;

transmit frequency domain transform means operatively connected to said transmit sampling means for generating respective transmit frequency domain transforms of the sampled transmit values;

receive sampling means for generating a series of sampled receive values of a signal received on the communications channel based upon the signal transmitted on the communications channel;

receive frequency domain transform means operatively connected to said receive sampling means for generating respective receive frequency domain transforms of the sampled receive values;

frequency domain adaptive filter means operatively connected to said transmit and receive frequency domain transform means for converging a plurality of filter coefficients based upon the transmit and receive frequency domain transforms, said frequency domain adaptive filter means comprising least mean square determining means for determining least mean square differences between estimated receive frequency domain transforms and the respective corresponding receive frequency domain transforms;

gain normalization means operatively connected to said frequency domain adaptive filter means for generating normalized gains of respective filter coefficients based upon spectral power of the respective transmit frequency domain transforms;

gain normalization weighting means operatively connected to said gain normalization means for weighting the normalized gains based upon frequency; and echo characterization output means operatively connected to said frequency domain adaptive filter means for generating an echo characterization value of the communications channel.

13. An apparatus according to claim 12 wherein said gain normalization weighting means further comprises means for weighting the normalized gains as a predetermined function of frequency.

14. An apparatus according to claim 12 wherein said gain normalization weighting means further comprises means for weighting the normalized gains so that normalized gains at a lower frequency have a greater weighting than normalized gains at higher frequencies.

15. An apparatus according to claim 13 wherein said gain normalization weighting means further comprises means for determining an estimated average echo to return noise ratio based upon the signal received from the communications channel and for selecting a predetermined gain normalization weighting function based upon the ratio.

16. An apparatus according to claim 12 wherein said echo path characterization means comprises means for generating at least one of an echo path loss signal and an echo delay signal.

17. An apparatus according to claim 12 further comprising threshold selection means operatively connected to said transmit frequency domain transform means for selecting values above a predetermined spectral power threshold.

18. An apparatus according to claim 12 further comprising logging means for recording an echo characterization value, a time the echo characterization was made, and a configuration of the communications channel at the time the echo characterization was made.

19. A telephone system comprising:

a plurality of telephone lines;

switch means connected to said plurality of telephone lines for selectively establishing connections between predetermined ones of said telephone lines to thereby establish a communications channel;

echo characterization means operatively connected to the communications channel established by said switch means for generating an echo characterization value of the communications channel, said echo characterization means comprising transmit sampling means for generating a series of sampled transmit values of a signal transmitted on the communications channel, transmit frequency domain transform means operatively connected to said transmit sampling means for generating respective transmit frequency domain transforms of the sampled transmit values, receive sampling means for generating a series of sampled receive values of a signal received on the communications channel based upon the signal transmitted on the communications channel, receive frequency domain transform means operatively connected to said receive sampling means for generating respective receive frequency domain transforms of the sampled receive values, frequency domain adaptive filter means operatively connected to said transmit and receive frequency domain transform means for converging a plurality of filter coefficients based upon the transmit and receive frequency domain transforms, and echo characterization output means operatively connected to said frequency domain adaptive filter means for generating the echo characterization value of the communications channel.

20. A telephone system according to claim 19 further comprising gain normalization means operatively connected to said frequency domain adaptive filter means for generating normalized gains of respective filter coefficients based upon spectral power of the respective transmit frequency domain transforms.

21. A telephone system according to claim 20 further comprising gain normalization weighting means operatively connected to said gain normalization means for weighting the normalized gains based upon frequency.

22. A telephone system according to claim 21 wherein said gain normalization weighting means further comprises means for weighting the normalized gains as a predetermined function of frequency.

23. A telephone system according to claim 21 wherein said gain normalization weighting means further comprises means for weighting the normalized gains so that normalized gains at a lower frequency have a greater weighting than normalized gains at higher frequencies.

24. A telephone system according to claim 22 wherein said gain normalization weighting means further comprises means for determining an estimated average echo to return noise ratio based upon the signal received from the communications channel and for selecting a predetermined gain normalization weighting function based upon the ratio.

25. A telephone system according to claim 19 wherein said echo path characterization means comprises means for generating one of an echo path loss signal and an echo delay value.

26. A telephone system according to claim 19 wherein said frequency domain adaptive filter means comprises least mean square determining means for determining least mean square differences between estimated receive frequency domain transforms and the respective corresponding receive frequency domain transforms.

27. A telephone system according to claim 19 further comprising threshold selection means operatively connected to said transmit frequency domain transform means for selecting values above a predetermined spectral power threshold.

28. A telephone system according to claim 19 further comprising logging means for recording an echo characterization value, a time the echo characterization was made, and a configuration of the communications channel at the time the echo characterization was made.

29. A telephone system according to claim 19 further comprising logging means for recording an echo characterization value, a time the characterization was made, and a configuration of the communications channel at the time the characterization was made.

30. A method for echo characterization of a communications channel, the method comprising the steps of:

generating a series of sampled transmit values of a signal transmitted on the communications channel;

generating respective transmit frequency domain transforms of the sampled transmit values;

generating a series of sampled receive values of a signal received on the communications channel based upon the signal transmitted on the communications channel;

generating respective receive frequency domain transforms of the sampled receive values;

converging a plurality of filter coefficients of a frequency domain adaptive filter based upon the transmit and receive frequency domain transforms;

generating an echo characterization value for the communications channel based upon convergence of the filter coefficients;

generating normalized gains of respective filter coefficients based upon spectral power of the respective transmit frequency domain transforms; and weighting the normalized gains as a predetermined function of frequency;

wherein the step of weighting the normalized gains by determining an estimated average echo to return noise ratio based upon the signal received from the communications channel and selecting a predetermined gain weighting based upon the ratio.

31. A method according to claim 30 wherein the step of generating the echo characterization value comprises generating at least one of an echo path loss value and an echo delay value.

32. A method according to claim 30 wherein the step of converging filter coefficients further comprises the step of determining least mean square differences between estimated receive frequency domain transforms and the respective corresponding receive frequency domain transforms.

33. A method according to claim 30 further comprising the step of selecting values of the transmit frequency domain transform above a predetermined spectral power threshold.

34. A method for echo characterization of a communications channel, the method comprising the steps of:

generating a series of sampled transmit values of a signal transmitted on the communications channel;

generating respective transmit frequency domain transforms of the sampled transmit values;

generating a series of sampled receive values of a signal received on the communications channel based upon the signal transmitted on the communications channel;

generating respective receive frequency domain transforms of the sampled receive values;

converging a plurality of filter coefficients of a frequency domain adaptive filter based upon the transmit and receive frequency domain transforms;

generating an echo characterization value for the communications channel based upon convergence of the filter coefficients; and displaying the echo characterization value.

35. A method according to claim 34 further comprising the step of logging a time and configuration for the communications channel along with the echo characterization value.

36. A method according to claim 34 further comprising the step of generating normalized gains of respective filter coefficients based upon spectral power of the respective transmit frequency domain transforms.

37. A method according to claim 36 further comprising the step of weighting the normalized gains based upon frequency.

38. A method according to claim 36 further comprising the step of weighting the normalized gains as a predetermined function of frequency.

39. A method according to claim 36 further comprising the step of weighting the normalized gains so that normalized gains at a lower frequency have a greater weighting than normalized gains at higher frequencies.

* * * * *